US006550668B2

(12) United States Patent
Costa

(10) Patent No.: US 6,550,668 B2
(45) Date of Patent: Apr. 22, 2003

(54) METHOD AND MEANS FOR RAPID HEAT-SINK SOLDERING

(76) Inventor: Larry J. Costa, 54201 Ash Rd., Osceola, IN (US) 46561

( * ) Notice: Subject to any disclaimer, the term of this patent is extended or adjusted under 35 U.S.C. 154(b) by 9 days.

(21) Appl. No.: 09/850,398

(22) Filed: May 7, 2001

(65) Prior Publication Data

US 2002/0162878 A1 Nov. 7, 2002

(51) Int. Cl.[7] ................ B23K 31/02; B23K 37/04; B23K 5/00
(52) U.S. Cl. ................ 228/212; 228/44.7; 228/46; 228/219; 228/222
(58) Field of Search ................ 228/200, 212, 228/213, 219, 222, 254, 42, 44.7, 46, 49.1, 49.5

(56) References Cited

U.S. PATENT DOCUMENTS

| | | | | |
|---|---|---|---|---|
| 3,640,519 A | * | 2/1972 | Halstead | 165/80.3 |
| 3,830,681 A | * | 8/1974 | Wilson | 156/583.2 |
| 3,845,606 A | * | 11/1974 | Wilson | 426/410 |
| 3,874,443 A | * | 4/1975 | Bayer, Jr. | 165/185 |
| 4,135,573 A | * | 1/1979 | Sutter | 165/185 |
| 4,632,294 A | * | 12/1986 | Druschel et al. | 228/119 |
| 4,889,277 A | * | 12/1989 | Zahn | 228/180.21 |
| 4,962,878 A | * | 10/1990 | Kent | 219/229 |
| 5,004,491 A | * | 4/1991 | McMaster et al. | |
| 2001/0039726 A1 | * | 11/2001 | Costa | |
| 2002/0162878 A1 | * | 11/2002 | Costa | |

* cited by examiner

Primary Examiner—Tom Dunn
Assistant Examiner—Kiley Stoner
(74) Attorney, Agent, or Firm—Thomte, Mazour & Niebergall; Shane M. Niebergall

(57) ABSTRACT

A method and system for instantaneous heat-sink soldering comprising a gripper device, an intense heat source, and an air-jet cooling system is provided for soldering terminals to structures of dissimilar material composition. The gripper device is adapted to secure the terminal between a pair of jaws and selectively position the terminal closely adjacent the structure. The jaws further serve as heat sinks to continually remove residual heat from the terminal, both during and after the application of heat to the terminal. Upon termination of the heat application, air-jet cooling is provided to the terminal to quickly cool the terminal and the molten layer of solder. The method of rapidly heating and cooling the terminal and layer of solder prevents the annealing of certain silica substrates and provides better solder connections.

15 Claims, 4 Drawing Sheets

METHOD AND MEANS FOR RAPID HEAT-SINK SOLDERING

BACKGROUND OF THE INVENTION

1. Field of the Invention

This invention relates to soldering methods and more particularly to a method of effectively soldering components together that have different compositions, such as metallic terminals to coated silica substrates.

2. Description of the Prior Art

Soldering components that have different compositions presents certain technical challenges. One example of this is the soldering of terminals made from metal, such as copper, brass, or plated steels, onto coated silica substrates, such as glass or ceramic. Two concerns that arise when soldering different materials together include the different rates of expansion of the materials and the re-crystallization of the silica based substrate.

Prior art soldering technology requires that the glass be relatively cool for the heated terminal's solder interface to solidify. This causes the cooled solder joint to contract and pre-stress the soldered interface, thereby reducing the mechanical strength of the connection. One specific example involves the soldering of copper electrical terminals to the silver oxide painted defrost grid of an automobile's rear window, as shown in FIG. 1. The rate of expansion for the glass, is approximately 0.000004 inches per degree Fahrenheit, compared to 0.000009 inches per degree Fahrenheit for copper. This becomes a problem when the components are heated and cooled for the solder interface to bond the components together. During heating, the copper terminal will expand more than the glass. During cooling, the solder joint will solidify while the terminal contracts a greater amount than the glass. This causes the fully cooled terminal to exert stress on the solder interface and the glass, reducing the mechanical strength of the connection. This problem is evident in several other applications, including the soldering of electrical connection pins to dense silica monolithic circuit chips.

Prior art soldering methods tend to generate an excessive amount of heat when the heat for soldering is applied. Oftentimes, such soldering methods will generate sufficient heat to anneal tempered safety glass. Safety glass is tempered by first heating it to a critical temperature, then rapidly cooling it below a specific temperature. During the soldering process, the copper terminal is heated to cause the solder to flow, allowing the terminal's heat to be transferred to the adjacent glass. This becomes a problem when the terminal's solder temperature reaches or surpasses the annealing temperature of the glass. During cooling, the solder joint will solidify and the glass adjacent to the terminal becomes annealed. This annealed section of the glass will no longer be safety tempered and will no longer break into the small fragments required by Federal Regulations.

Therefore, there is a need for an improved method and system for soldering components together that are composed of different materials.

SUMMARY OF THE INVENTION

A method and system for rapidly soldering a solder-coated terminal to a structure, having a different material composition than the terminal, is disclosed herein. The system comprises an intense heat source, such as an intermittent micro flame, a terminal gripper, having gripping jaws that are comprised of a heat-conductive material, and an optional air-jet cooler.

The terminal is first secured between the jaws of the gripper, which are further adapted to selectively position the terminal closely adjacent the structure. Intense heat is applied to the terminal, in this instance being solder-coated, causing the solder to melt. The jaws are sufficient in thermal conductivity to serve as a heat sink, preventing the temperature of the terminal to significantly increase beyond the solder melting point during heating. This minimizes the transmission of heat from the terminal and layer of molten solder to the structure. After the solder has melted, the intense heat source is shut off and an optional jet of cool air is directed to the terminal. While the jet of air is cooling the terminal and layer of solder, the gripping jaws continue to remove residual heat from the terminal. These methods of cooling cause the solder joint to rapidly solidify.

Using this method and system, the time required to first melt the solder layer and then solidify the solder connection is short enough that the effect of the different rates of expansion between the terminal and the structure is greatly minimized. This is of great importance when the terminal-receiving structure is made of glass, such as tempered safety glass. The rapid heating and cooling time aid in preventing the safety glass from annealing and further allows for a stronger solder contact.

Therefore, a principal object of the invention is to provide an improved system for instantaneous heat sink soldering.

Still another object of the invention is to provide a system for instantaneous heat sink soldering that reduces the heat transfer from a heated metallic terminal to a silica/glass structure.

Still another object of the invention is to provide a system for instantaneous heat sink soldering that reduces the time required for solidifying the molten solder.

Yet another object of the invention is to provide a system for instantaneous heat sink soldering that will not anneal a tempered glass structure to which a metallic terminal is soldered.

Still another object of the invention is to provide a system for instantaneous heat sink soldering that minimizes the effect of the difference in the rate of expansion between a metallic terminal and a silica/glass structure when the two structures are soldered together.

These and other objects will be apparent to those skilled in the art.

DESCRIPTION OF THE PREFERRED EMBODIMENT

Figure 1:
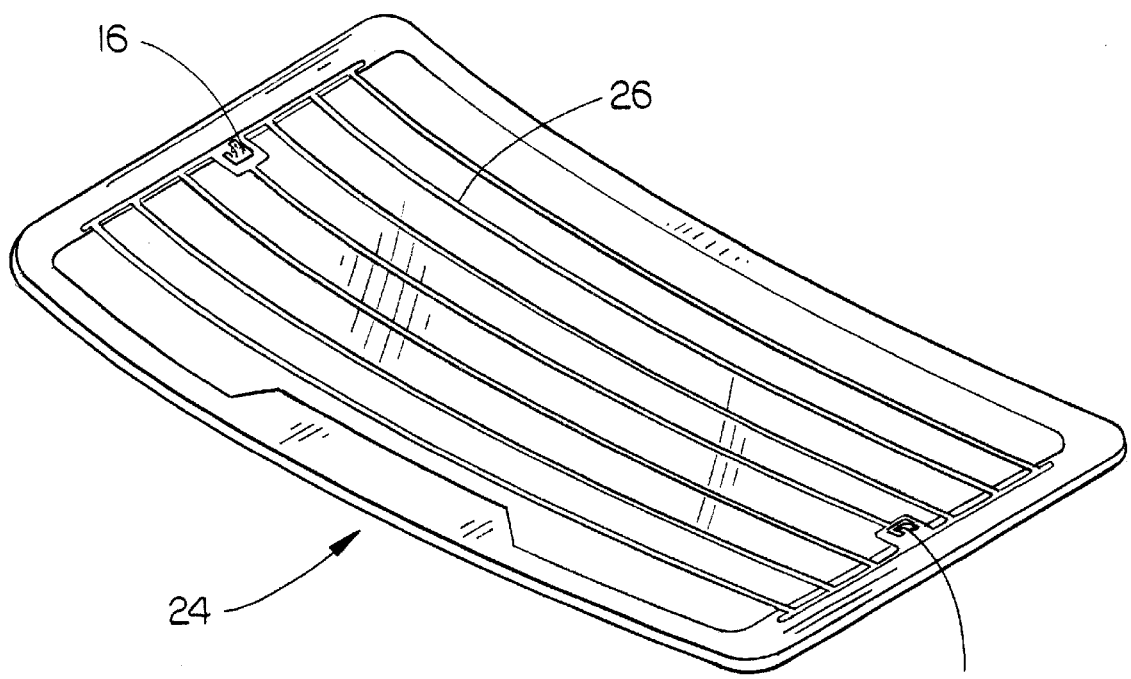
FIG. 1 is a perspective view of an automobile window.
Figure 2:
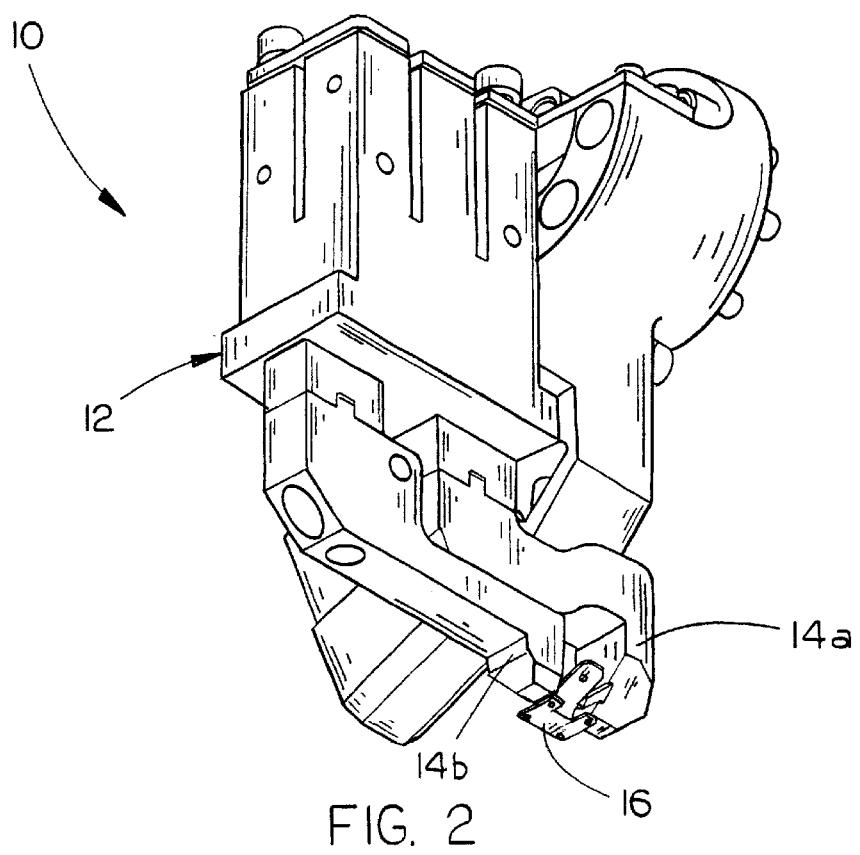
FIG. 2 is a view of the lower right side of the present soldering system.
Figure 3:
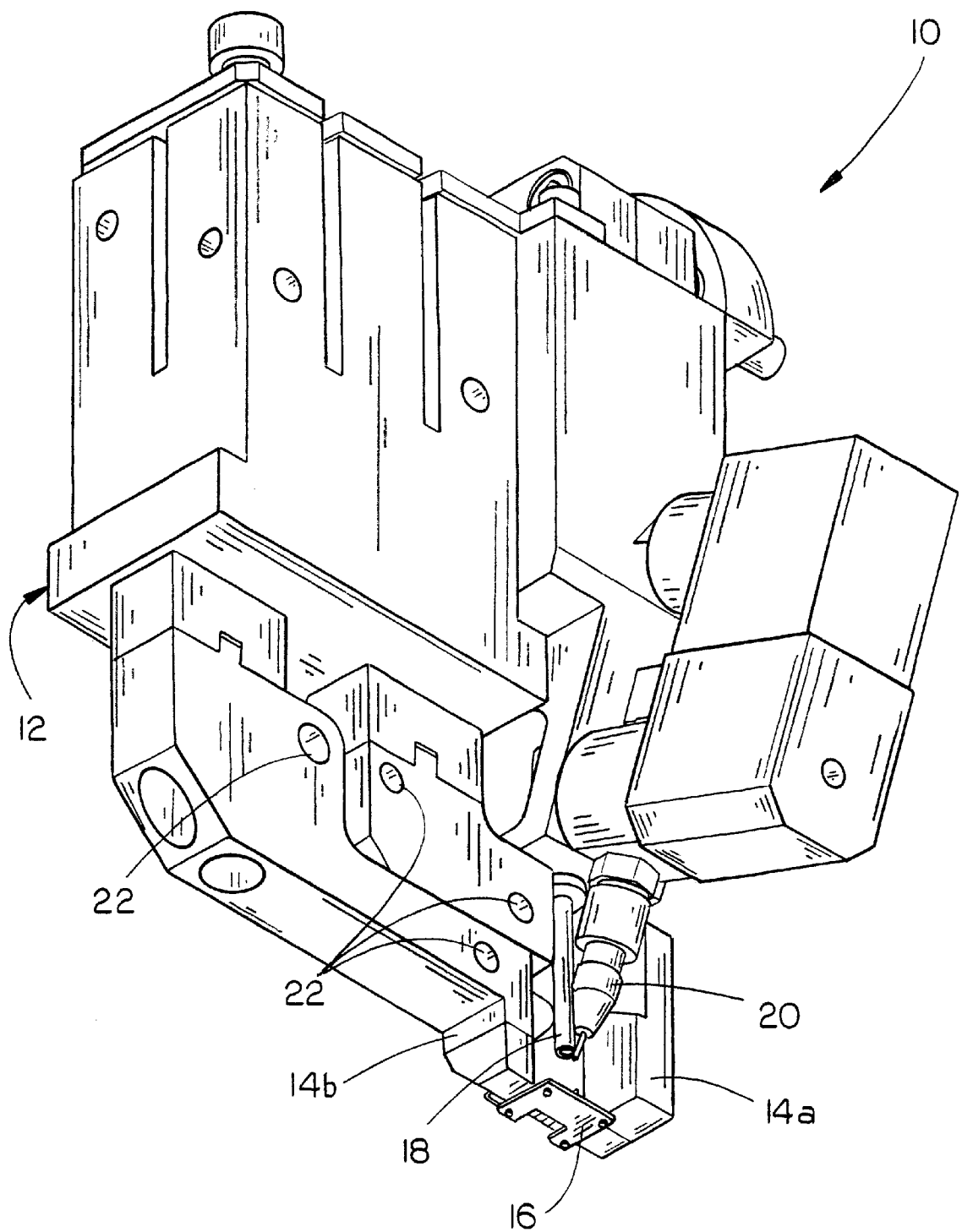
FIG. 3 is a view of the lower left side of the present soldering system.
Figure 4:
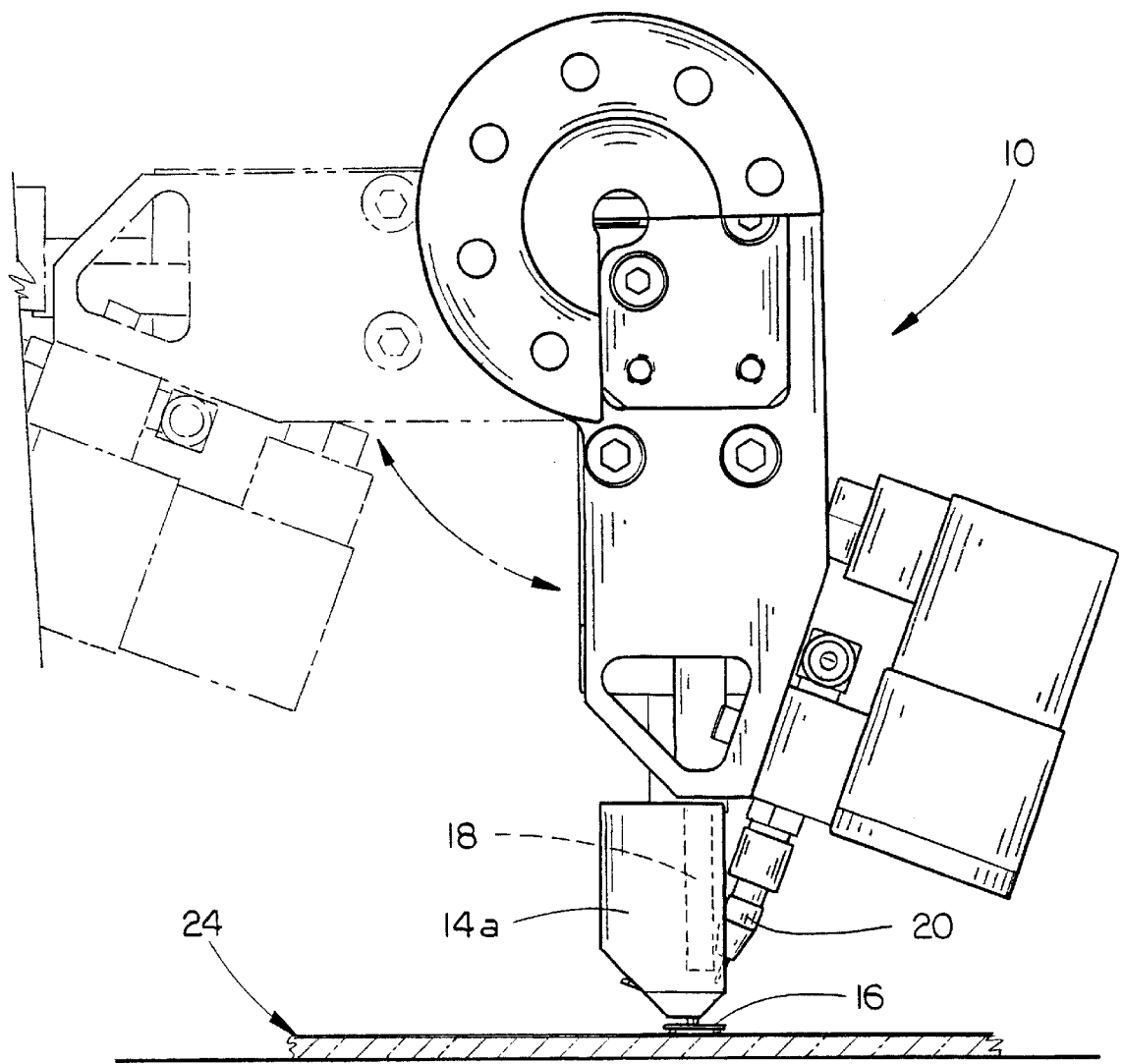
FIG. 4 is a side view of the present soldering system, showing the soldering arm in its extended working position.
Figure 5:
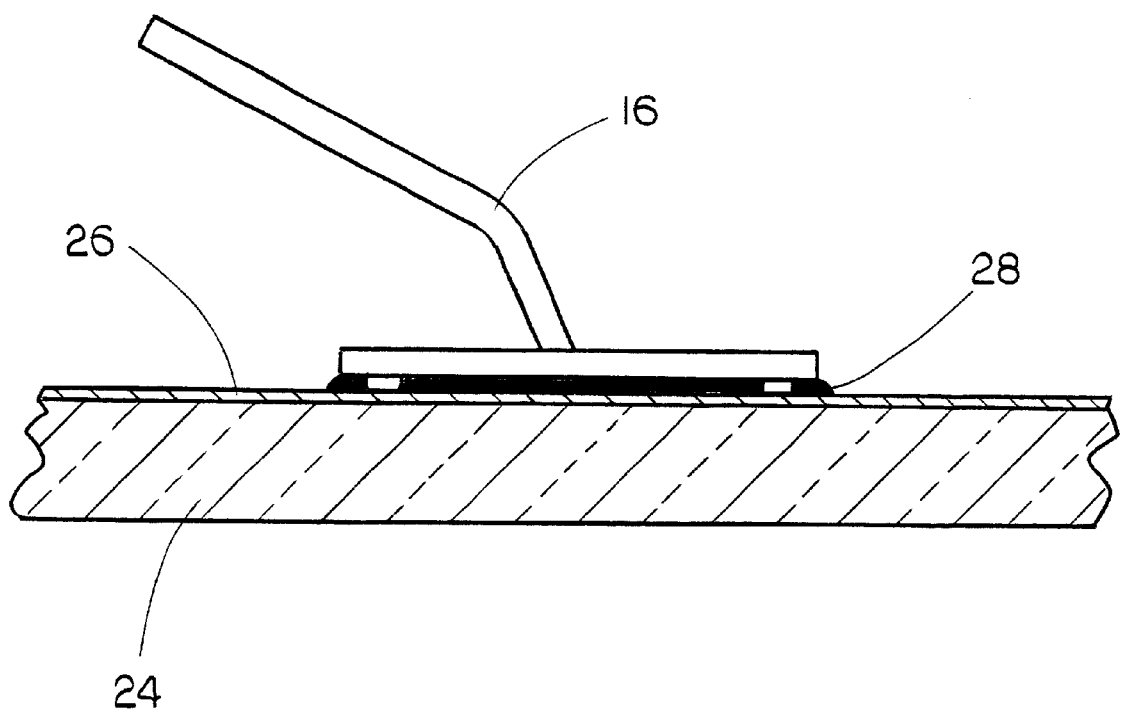
FIG. 5 is an enlarged view of a terminal that has been soldered to a glass structure.

The numeral 10 refers generally to the rapid heat-sink soldering system of this invention. As shown in FIGS. 2–4, the system 10 generally includes a gripper 12, a pair of generally parallel jaws 14a and 14b, ignition source 18, and an intense heat source 20. Although the foregoing elements could be incorporated into manually operated and automated devices, the following embodiment will be described as an automated device. Moreover, it is contemplated that the specific arrangement and type of elements described herein could be modified to implement the methods of soldering discussed herein.

The air-actuated gripper 12 of the present embodiment is adapted to move the parallel jaws 14a and 14b toward or away from each other. The jaws 14a and 14b are adapted to grab, hold, and release a terminal 16 or other desired workpiece. Although the present embodiment uses a pair of jaws 14a and 14b for workpiece holding, it is contemplated that the number of jaws used in a particular embodiment will be dictated by the geometric shape of the chosen workpiece. For example, three or more jaws may be preferred when the workpiece has a round geometry, such as a snap terminal.

The soldering mechanism of the present embodiment is comprised of an intermittent micro flame soldering tool 20, although it is contemplated that virtually any number of intense heat sources, such as electrical resistance, laser, friction, ultrasonic, induction, etc., could be employed in the device. Adjacent the soldering tool 20 is disposed an elongated, hollow structure 18 which is comprised of an electrically conductive material such as stainless steel, copper, nickel, or gold. In this configuration the structure serves as both the ignition source for soldering tool 20 and as a conduit for air-jet cooling (discussed herein below). The ignition role of structure 18 is performed through the transmission of an electric current through structure 18. Although any number of sources could be used, the present embodiment uses 8-mm high-tension insulated wire, which originates above structure 18 in the gripper 12, to produce the required electrical current. The electric current reaches the terminal end of structure 18 and ignites the fuel utilized by the intermittent micro flame 20.

Preferably, terminal 16, or any other type of workpiece used, comprises an integrated solder layer disposed on the surface of terminal 16 that is to be connected to the glass plate 24. The terminal 16 may also have a flux coating applied thereto. It is contemplated, however, that the soldering system 10 may also be comprised of a conventional apparatus for applying soldering related materials, such as a flux coating apparatus, solder paste application, or solder-wire feeder apparatus (none of which are depicted in FIGS. 1–5). In either case, however, the apparatus would apply the soldering materials to the terminal 16 immediately prior to the implementation of terminal 16.

In operation, the parallel jaws 14a and 14b are drawn toward each other by the gripper 12 to grasp an individual terminal 16. The gripper 12 is positioned such that the parallel jaws 14a and 14b hold the terminal 16 at its point of use, as shown in FIG. 4. The soldering tool is then operated such that it heats terminal 16 to a temperature which is sufficient to melt the solder disposed on the underside of terminal 16, thereby adhering terminal 16 to the silver oxide structure 26 located on glass plate 24. The intermittent micro flame 20 is then extinguished. Due to the intense heat used (approximately 5,400 degrees Fahrenheit) the total solder cycle is accomplished in approximately 2.0 seconds. The final solder "wetting" phase of the solder cycle is accomplished in approximately 0.2 seconds, which is typically an insufficient time to transfer heat from the terminal 16 to the glass plate 24 such that the glass plate 24 would anneal.

Rapid cooling of the solder layer 28 is attained through the use of heat-sinking. The jaws 14a and 14b that support terminal 16 further serve as heat sinks for the present soldering device 10. Jaws 14a and 14b are preferably comprised of a conductive material such as stainless steel, copper, nickel, or gold. It is further preferred that the conductive material be non-corrosive, to prevent deterioration and or loss of thermal conductivity. When intense heat is applied to the terminal 16 to melt the solder, the excess heat is transmitted through jaws 14a and 14b, away from the glass plate 24.

Air-jet cooling can also be provided to assist in the rapid cooling of the solder layer 28. Once the intense heat source is removed from terminal 16, a solenoid valve that is pneumatically connected to gripper 12 is actuated to force cool air into the system and through hollow structure 18, thereby providing a jet of cool air directly onto terminal 16. Alternative embodiments of the air-jet cooling method employ a compressed inert gas, such as nitrogen or carbon dioxide, or shielding gas, such as helium, that is directed to the terminal through hollow structure 18. The use of an inert or shielding gas to cool the terminal, layer of solder, and the structure, provides the added benefit of minimizing the oxidation of the component parts as they cool.

Additional heat sinking could be accomplished by cooling jaws 14a and 14b with a system of internal cooling 22, which uses non-combustible gas or liquid that is channeled throughout the system, or external cooling source (not shown) that directs non-combustible gas or liquid to the external surface of the system. Regardless of the heat-sinking method used, it is important that the post-solder cooling be accomplished by the heat sinks and/or the air-jet cooling system, rather than the transfer of heat through the glass plate 24. These methods not only help to prevent the annealing of the glass plate 24, but further allow for rapid cooling to occur once the intense heat source is removed from terminal 16.

Where the terminal 16 does not have a layer of solder predisposed on the lower surface thereof, the soldering mechanism of the present invention is ideally suited to first apply a solder layer to the terminal 16 and then secure the terminal 16 to the glass plate 24. For example, after a terminal 16 has been secured between jaws 14a and 14b, the jaws 14a and 14b could be used to position the terminal 16 closely adjacent a solder-wire feeder apparatus, or other conventional device. Sufficient heat is then applied to the terminal 16, using the intermittent micro flame soldering tool 20, to melt the solder-wire. The surface tension of the molten solder will allow it to adhere to the lower surface of terminal 16. The molten solder rapidly cools (as described previously), forming a solid solder layer 28 along the lower surface of the terminal 16. The jaws 14a and 14b then position the terminal 16 closely adjacent the glass plate 24 and the soldering cycle described previously is commenced.

The terminal 16 can also be soldered to the glass plate 24 when the glass is preheated to a temperature just below the temperature that the solder layer 28 becomes molten. This minimizes the effect of the difference in the rate of expansion between the terminal 16 and the glass plate 24, thereby reducing the stress that the terminal 16 will exert on the surface of the glass plate 24 once the solder layer 28 is fully cooled. This effectively improves the mechanical strength of the connection between terminal 16 and glass plate 24.

In the drawings and in the specification, there has been set forth preferred embodiments of the invention and although specific items are employed, these are used in a generic and descriptive sense only and not for purposes of limitation. Changes in the form and proportion of parts, as well as a substitution of equivalents, are contemplated and circumstances may suggest or render expedient without departing from the spirit or scope of the invention as further defined in the following claims.

Thus it can be seen that the invention accomplishes at least all of its stated objectives.

I claim:

1. A system for soldering a terminal, having first and second surfaces and a layer of solder disposed on said second surface, to an underlying glass substrate, comprising:
   a workpiece gripper, having gripping jaws that are adapted to secure the terminal workpiece therebetween and position the terminal closely adjacent the underlying glass substrate;
   a heat source for heating the terminal, when the terminal has been positioned closely adjacent the underlying glass substrate, to a temperature that is at least sufficient to melt the layer of solder; and
   means for removing excess heat from the terminal and molten layer of solder so that any heat disbursal to the underlying glass substrate is insufficient to anneal the underlying glass substrate.

2. The system of claim 1 wherein said terminal and said structure have dissimilar material compositions.

3. The system of claim 1 further comprising a cooling device for forcing compressed gas into the system and directing a jet of air to the terminal for cooling the terminal.

4. The system of claim 1 wherein said intense heat source is an intermittent micro flame.

5. The system of claim 4 further comprising an ignition source, closely adjacent said intermittent micro flame.

6. A method for soldering a terminal, having first and second surfaces and a layer of solder disposed on said second surface, to an underlying glass substrate, having at least a workpiece gripper, gripping jaws comprised of a heat-conductive material, and a heat source, comprising the steps of:
   securing the terminal between said gripping jaws;
   positioning said terminal closely adjacent the underlying glass substrate;
   heating the terminal with sufficient heat from said heat source to overcome the heat-conductive capability of said gripping jaws and melt the layer of solder;
   terminating the application of heat to the terminal; and
   conducting excess heat away from the terminal and molten solder, through the gripping jaws, so that the terminal and molten solder are rapidly cooled and heat disbursal through the terminal and layer of solder to said underlying glass substrate is insufficient to anneal the underlying glass substrate.

7. The method of claim 6 wherein said terminal and said structure have dissimilar material compositions.

8. The method of claim 6 further comprising a cooling device for forcing compressed gas into the system and directing a jet of air to the terminal.

9. The method of claim 8 further comprising the step of cooling the terminal and molten solder with said cooling device after the application of heat to the terminal has been terminated.

10. The method of claim 8 wherein said compressed gas is comprised of air.

11. The method of claim 8 wherein said compressed gas is comprised of an inert gas, so that oxidation of the terminal, the layer of solder, and the structure, is minimized.

12. The method of claim 11 wherein said inert compressed gas is a shielding gas.

13. A system for soldering a terminal, having first and second surfaces and a layer of solder disposed on said second surface, to an underlying glass substrate, comprising:
   a solder dispensing apparatus having solder material disposed therein;
   a workpiece gripper, having gripping jaws that are adapted to secure the terminal workpiece therebetween and position the terminal closely adjacent the underlying glass substrate;
   a heat source for heating the terminal, when the terminal has been positioned closely adjacent the underlying glass substrate, to a temperature that is at least sufficient to melt the layer of solder; and
   means for removing excess heat from the terminal and molten layer of solder so that any heat disbursal to the underlying glass substrate is insufficient to anneal the underlying glass substrate.

14. A method for soldering a terminal, having first and second surfaces, to a structure, the terminal and structure having dissimilar material compositions, having at east a solder dispensing apparatus with solder material disposed therein, a workpiece gripper, gripping jaws comprised of a heat-conductive material, and a heat source, comprising the steps of:
   securing the terminal between said gripping jaws;
   positioning said terminal closely adjacent the solder dispensing apparatus and dispensing solder material adjacent said second surface of said terminal;
   heating the terminal with sufficient heat from said heat source to overcome the heat-conductive capability of said gripping jaws and melt the solder material so that the molten solder material adheres to the second surface of the terminal; terminating the application of heat to the terminal; and
   conducting excess heat away from the terminal and molten solder, through the gripping jaws, so that the terminal and molten solder are rapidly cooled, forming a solder layer on the second surface of the terminal;

positioning said terminal closely adjacent the structure;

heating the terminal with sufficient heat from said heat source to overcome the heat-conductive capability of said gripping jaws and melt the solder layer;

terminating the application of heat to the terminal; and conducting excess heat away from the terminal and molten solder, through the gripping jaws, so that the terminal and molten solder are rapidly cooled and the disbursal of heat through the terminal and layer of solder to said structure is minimized.

15. A system for soldering a terminal, having first and second surfaces and a layer of solder disposed on said second surface, to a structure, comprising:

a workpiece gripper, having gripping jaws that are adapted to secure the terminal workpiece therebetween and position the terminal closely adjacent the structure; and a heat source for heating the terminal, when the terminal has been positioned closely adjacent the structure, to a temperature that is at least sufficient to melt the layer of solder;

said gripping jaws being comprised of a heat-conductive material so that said gripping jaws serve as a heat sink for removing excess heat from the terminal and molten layer of solder;

said heat source being an intermittent micro flame;

an ignition source, closely adjacent said intermittent micro flame;

said ignition source being comprised of an elongated hollow structure that is adapted to direct a jet of air to the terminal for cooling the terminal.

* * * * *